US012123510B2

(12) United States Patent
Bouchard

(10) Patent No.: US 12,123,510 B2
(45) Date of Patent: Oct. 22, 2024

(54) COMPACT VALVE ASSEMBLY

(71) Applicant: Watts Regulator Co., North Andover, MA (US)

(72) Inventor: Peter P. Bouchard, Ayer, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 18/021,131

(22) PCT Filed: Aug. 17, 2021

(86) PCT No.: PCT/US2021/046208
§ 371 (c)(1),
(2) Date: Feb. 13, 2023

(87) PCT Pub. No.: WO2022/040121
PCT Pub. Date: Feb. 24, 2022

(65) Prior Publication Data
US 2023/0313508 A1 Oct. 5, 2023

Related U.S. Application Data

(60) Provisional application No. 63/066,411, filed on Aug. 17, 2020.

(51) Int. Cl.
*E03B 7/07* (2006.01)
*E03C 1/10* (2006.01)
(Continued)

(52) U.S. Cl.
CPC ............ *F16K 15/066* (2013.01); *E03B 7/077* (2013.01); *E03C 1/106* (2013.01); *E03F 7/04* (2013.01);
(Continued)

(58) Field of Classification Search
CPC .. E03B 7/077; E03C 1/106; E03F 7/04; F17C 2205/0308; F16F 1/122; F16F 1/125;
(Continued)

(56) References Cited

U.S. PATENT DOCUMENTS

| 213,394 A | 3/1879 | Cornwall |
| 623,418 A | 4/1899 | O'Meara |

(Continued)

FOREIGN PATENT DOCUMENTS

| CN | 110081212 A | 8/2019 |
| DE | 1925477 A1 | 12/1970 |

(Continued)

OTHER PUBLICATIONS

Ames Fire & Waterworks, division of Watts Industries, F-A-Spools/Flanges (2001) 4 pages.
(Continued)

*Primary Examiner* — Kevin F Murphy
*Assistant Examiner* — Jonathan J Waddy
(74) *Attorney, Agent, or Firm* — Day Pitney LLP; George N. Chaclas; Anthony A. Kassas

(57) ABSTRACT

A backflow prevention assembly has a body having a first bucket with a sidewall extending between a closed end and an open end along a first bucket axis, a first conduit extending from an inlet of the sidewall of the first bucket, and a second bucket having a sidewall extending between a closed end and an open end along a second bucket axis. A second conduit extends between an outlet of the sidewall of the first bucket and an inlet of the sidewall of the second bucket, and a third conduit extends from an outlet of the sidewall of the second bucket. The conduits extend along a conduit axis that is perpendicular to the bucket axes. The valve assembly includes covers secured over the open ends of the buckets and a valve member located in each bucket that is biased to prevent reverse flow through the inlets of the buckets.

14 Claims, 11 Drawing Sheets

(51) Int. Cl.
*E03F 7/04* (2006.01)
*F16K 15/03* (2006.01)
*F16K 15/06* (2006.01)
*F16K 27/02* (2006.01)
*F16K 27/12* (2006.01)
*F16K 37/00* (2006.01)
*F16K 17/30* (2006.01)

(52) U.S. Cl.
CPC ........ *F16K 15/035* (2013.01); *F16K 27/0209* (2013.01); *F16K 27/0227* (2013.01); *F16K 27/12* (2013.01); *F16K 37/0091* (2013.01); *F16K 15/033* (2013.01); *F16K 17/30* (2013.01); *F16K 2200/501* (2021.08)

(58) Field of Classification Search
CPC .. F16F 1/42; F16F 2230/0005; F16F 2230/14; F16F 2230/32; F16K 1/36; F16K 15/033; F16K 15/035; F16K 15/066; F16K 17/30; F16K 27/0209; F16K 27/0232; F16K 27/12; F16K 35/00; F16K 37/005; F16K 37/0091; F16K 2200/50; F16K 2200/501; F16K 2200/502; F16K 27/0227; F16L 37/373; F16L 37/47; Y10T 137/5153; Y10T 137/5196
See application file for complete search history.

(56) References Cited

U.S. PATENT DOCUMENTS

| | | |
|---|---|---|
| 953,940 A | 4/1910 | Beam |
| 2,310,586 A | 2/1943 | Lohman |
| 2,514,374 A | 7/1950 | Cooper |
| 2,827,921 A | 3/1958 | Sherman et al. |
| 3,173,439 A | 3/1965 | Griswold et al. |
| 3,189,037 A | 6/1965 | Modesto |
| 3,429,291 A | 2/1969 | Hoffman |
| 3,570,537 A | 3/1971 | Kelly |
| 3,817,278 A | 6/1974 | Elliott |
| 3,837,357 A | 9/1974 | Slaughter |
| 3,837,358 A | 9/1974 | Zieg et al. |
| 3,859,619 A | 1/1975 | Ishihara et al. |
| 3,896,850 A | 7/1975 | Waltrip |
| 3,905,382 A | 9/1975 | Waterston |
| 3,906,987 A | 9/1975 | Rushforth et al. |
| 3,996,962 A | 12/1976 | Sutherland |
| 4,014,284 A | 3/1977 | Read |
| 4,244,392 A | 1/1981 | Griswold et al. |
| 4,276,897 A * | 7/1981 | Griswold ................ E03C 1/108 137/107 |
| 4,284,097 A | 8/1981 | Becker et al. |
| 4,416,211 A | 11/1983 | Hoffman |
| 4,452,272 A * | 6/1984 | Griswold ................ E03C 1/108 137/543.13 |
| 4,453,561 A | 6/1984 | Sands |
| 4,489,746 A | 12/1984 | Daghe et al. |
| 4,523,476 A | 6/1985 | Larner |
| 4,618,824 A | 10/1986 | Magee et al. |
| 4,667,697 A | 5/1987 | Crawford |
| 4,694,859 A | 9/1987 | Smith, III |
| 4,776,365 A | 10/1988 | Bathrick et al. |
| 4,777,979 A | 10/1988 | Twerdochlib |
| 4,920,802 A | 5/1990 | Mcmullin et al. |
| 4,945,940 A | 8/1990 | Stevens |
| 5,008,841 A | 4/1991 | Mcelroy |
| 5,024,469 A | 6/1991 | Aitken et al. |
| 5,072,753 A | 12/1991 | Ackroyd |
| 5,125,429 A | 6/1992 | Ackroyd et al. |
| 5,236,009 A | 8/1993 | Ackroyd |
| 5,299,718 A | 4/1994 | Shwery |
| 5,404,905 A | 4/1995 | Lauria |
| 5,425,393 A | 6/1995 | Everett |
| 5,452,974 A | 9/1995 | Binns |
| 5,520,367 A | 5/1996 | Stowers |
| 5,551,473 A | 9/1996 | Lin et al. |
| 5,566,704 A | 10/1996 | Ackroyd et al. |
| 5,584,315 A | 12/1996 | Powell |
| 5,586,571 A | 12/1996 | Guillermo |
| 5,669,405 A | 9/1997 | Engelmann |
| 5,709,240 A * | 1/1998 | Martin ................ F16K 15/025 137/527.2 |
| 5,711,341 A | 1/1998 | Funderburk et al. |
| 5,713,240 A | 2/1998 | Engelmann |
| 5,794,655 A * | 8/1998 | Funderburk .......... F16K 15/033 137/527.2 |
| 5,901,735 A | 5/1999 | Breda |
| 5,918,623 A | 7/1999 | Hidessen |
| 5,947,152 A | 9/1999 | Martin et al. |
| 5,950,653 A * | 9/1999 | Folsom .................... E03C 1/108 137/115.18 |
| 5,992,441 A | 11/1999 | Enge et al. |
| 6,021,805 A | 2/2000 | Horne et al. |
| 6,123,095 A | 9/2000 | Kersten et al. |
| 6,155,291 A | 12/2000 | Powell |
| 6,170,510 B1 | 1/2001 | King et al. |
| 6,196,246 B1 * | 3/2001 | Folsom ................... E03C 1/106 137/340 |
| 6,343,618 B1 | 2/2002 | Britt et al. |
| 6,349,736 B1 | 2/2002 | Dunmire |
| 6,374,849 B1 | 4/2002 | Howell |
| 6,378,550 B1 | 4/2002 | Herndon et al. |
| 6,443,184 B1 | 9/2002 | Funderburk |
| 6,471,249 B1 | 10/2002 | Lewis |
| 6,513,543 B1 | 2/2003 | Noll et al. |
| 6,546,946 B2 | 4/2003 | Dunmire |
| 6,581,626 B2 | 6/2003 | Noll et al. |
| 6,659,126 B2 | 12/2003 | Dunmire et al. |
| 6,675,110 B2 | 1/2004 | Engelmann |
| 7,051,763 B2 | 5/2006 | Heren |
| 7,114,418 B1 | 10/2006 | Allen |
| 7,434,593 B2 | 10/2008 | Noll et al. |
| 7,506,395 B2 | 3/2009 | Eldridge |
| 7,784,483 B2 | 8/2010 | Grable et al. |
| 7,934,515 B1 | 5/2011 | Towsley et al. |
| 8,220,839 B2 | 7/2012 | Hall |
| 8,997,772 B2 | 4/2015 | Noll et al. |
| 9,091,360 B2 | 7/2015 | Frahm, II |
| 9,546,475 B2 | 1/2017 | Lu |
| 9,899,819 B1 | 2/2018 | Holloway |
| 9,995,605 B2 | 6/2018 | Konno et al. |
| 10,132,425 B2 | 11/2018 | Di Monte, Sr. |
| D876,585 S | 2/2020 | Li et al. |
| 10,561,874 B2 | 2/2020 | Williams et al. |
| D886,236 S | 6/2020 | Pfund et al. |
| 10,719,904 B2 | 7/2020 | Yasumuro et al. |
| D908,191 S | 1/2021 | Li et al. |
| 10,883,893 B2 | 1/2021 | Shaw, Jr. et al. |
| 10,914,412 B2 | 2/2021 | Doughty et al. |
| 10,962,143 B2 | 3/2021 | Cis et al. |
| D917,013 S | 4/2021 | Pfund et al. |
| D919,048 S | 5/2021 | Li et al. |
| D919,049 S | 5/2021 | Li et al. |
| D928,916 S | 8/2021 | Shim |
| 11,137,082 B2 | 10/2021 | Okuno et al. |
| D941,426 S | 1/2022 | Downing et al. |
| D957,587 S | 7/2022 | Downie et al. |
| D958,937 S | 7/2022 | Pfund et al. |
| 2002/0043282 A1 | 4/2002 | Horne et al. |
| 2002/0078801 A1 | 6/2002 | Persechino |
| 2003/0000577 A1 | 1/2003 | Noll et al. |
| 2003/0168105 A1 | 9/2003 | Funderburk |
| 2004/0045604 A1 | 3/2004 | Dunmire et al. |
| 2004/0107993 A1 | 6/2004 | Stephens |
| 2005/0092364 A1 | 5/2005 | Furuya et al. |
| 2005/0199291 A1 | 9/2005 | Price et al. |
| 2006/0076062 A1 | 4/2006 | Andersson |
| 2006/0196542 A1 | 9/2006 | Yen |
| 2007/0181191 A1 | 8/2007 | Wittig et al. |
| 2007/0193633 A1 | 8/2007 | Howell et al. |
| 2007/0204916 A1 | 9/2007 | Clayton et al. |
| 2007/0204917 A1 | 9/2007 | Clayton et al. |
| 2007/0240765 A1 | 10/2007 | Katzman et al. |

(56) References Cited

U.S. PATENT DOCUMENTS

| | | | |
|---|---|---|---|
| 2008/0145739 A1 | 6/2008 | Adams et al. | |
| 2008/0289567 A1 | 11/2008 | Gordon | |
| 2009/0136935 A1 | 5/2009 | Petersen | |
| 2009/0194719 A1 | 8/2009 | Mulligan | |
| 2011/0067225 A1 | 3/2011 | Bassaco | |
| 2011/0309076 A1 | 12/2011 | Liebenberg et al. | |
| 2012/0248759 A1 | 10/2012 | Feith | |
| 2013/0026743 A1 | 1/2013 | Baca | |
| 2013/0255452 A1 | 10/2013 | Kovach | |
| 2014/0109986 A1 | 4/2014 | Cordes | |
| 2017/0023141 A1 | 1/2017 | Andersson | |
| 2018/0156488 A1 | 6/2018 | Evans et al. | |
| 2019/0043157 A1 | 2/2019 | Yasumuro et al. | |
| 2019/0136935 A1 | 5/2019 | Hulstein et al. | |
| 2019/0162341 A1 | 5/2019 | Chiproot | |
| 2019/0271428 A1 | 9/2019 | O'Connor et al. | |
| 2019/0323618 A1 | 10/2019 | Fletcher et al. | |
| 2020/0141612 A1 | 5/2020 | Thibodeaux, Jr. | |
| 2020/0370677 A1 | 11/2020 | Mendez | |
| 2021/0172157 A1 | 6/2021 | Burke et al. | |
| 2021/0230850 A1 | 7/2021 | Bouchard et al. | |
| 2021/0332898 A1 | 10/2021 | Cellemme | |
| 2022/0049487 A1* | 2/2022 | Bouchard | E03C 1/106 |
| 2022/0049786 A1* | 2/2022 | Doughty | F16K 27/0232 |
| 2022/0412474 A1* | 12/2022 | Bouchard | F16K 15/035 |
| 2023/0228067 A1* | 7/2023 | Bouchard | F16K 27/0232 |
| | | | 137/511 |
| 2024/0093797 A1* | 3/2024 | Bouchard | F16K 27/0209 |

FOREIGN PATENT DOCUMENTS

| | | |
|---|---|---|
| DE | 202014102568 U1 | 9/2015 |
| EP | 1521004 A1 | 4/2005 |
| EP | 3434833 A1 | 1/2019 |
| EP | 3832183 A1 | 6/2021 |
| FR | 2928750 A1 | 9/2009 |
| GB | 1231579 | 11/1967 |
| JP | 2002-013629 A | 7/2002 |
| WO | 03060459 A1 | 7/2003 |
| WO | 2020023584 A1 | 1/2020 |

OTHER PUBLICATIONS

Apollo Valves PVB4A Series Installation, Operation and Maintenance Manual for Model PVB4A ½"-2" Pressure Vacuum Breaker Backflow Preventer, dated Jan. 11, 2012, 12 pages.

Apollo Valves PVB4A Series Installation, Operation, and Maintenance Manual, copyright May 2009, 9 pages.

Conbraco BFMMPVB Maintenance Manual for Series 4V-500 ½"-2" Pressure Type Vacuum Breaker (Apr. 2002) Conbraco Industries, Inc., Matthews, North Carolina 28106, 6 pages.

European Search Report for European Patent Application No. 20192133.5 dated Feb. 1, 2021 , 9 pages.

Extended European Search Report received for European Patent Application No. 20211811.3, dated May 4, 2021, 8 pages.

International Search Report and Written Opinion issued in corresponding international patent application No. PCT/US2021/046101, dated Nov. 22, 2021, 8 pages.

International Search Report and Written Opinion issued in corresponding International Patent Application No. PCT/US2021/062395, dated Feb. 23, 2022, 14 pages.

Lead Free Master Series LF870V product specifications pages, ES-F-LF-870V 1826 (2018) 4 pages.

Watt TK-99E Backflow Preventer Test Kit Product Specifications and Test Information, IS-TK99E 0829 (2009) 4 pages.

Watts Regulator Co., WATTS ACV 113-6RFP Floor Protection Shutdown Valve for Health Hazard Applications (2020) 4 pages.

Watts Water Company, Series 909RPDA for Health Hazard Applications (2016) 4 pages.

Watts Water Technologies Company Brochure ES LF800M4QT for Health Hazard Applications Lead Free Series LF8 M4QT Anti-Siphon Vacuum Breakers Sizes 1/2"-2", copyright 2013, 4 pages.

Watts Water Technologies Company, Installation, Maintenance & Repair Series 909, LF909, 909RPDA, LF909RPDA (2016) 8 pages.

Watts, "Double Check Valve Assembly Backflow Preventers, Bronze," Article 1 (2021) 6 pages.

Watts, "Reduced Pressure Zone Assembly Backflow Preventers, Bronze Body, Sizes ¼-2 IN," Article 1 (2021) 16 pages.

Watts, S-RetroFit-Simple (2017) 2 pages.

Wilkins Company, Model 375/475MS Series, Installation, Maintenance and Instruction Sheet (2006) 1 page.

Zurn Wilkins 300AR Series, Backflow Preventor Order Form No. 480-060 (Apr. 2017) 2 pages.

EP Communication pursuant to Article 94(3) EPC for corresponding Application No. 20211811.3 dated Mar. 3, 2023.

International Search Report and Written Opinion issued in corresponding International Patent Application No. PCT/US2021/046208, dated Dec. 1, 2021, 7 pages.

Watts Regulator Co. 0887224 Series 909 Reduced Pressure Zone Assemblies Relief/Check Valve Kits 2 ½"- 10", site visited Jul. 19, 2023; URL: https://controlscentral.com/tabid/63/ProductID/315241/watts-regulator-0887224-series-909-reduced-pressure-zone-assemblies-relief.aspx (Year: 2023).

* cited by examiner

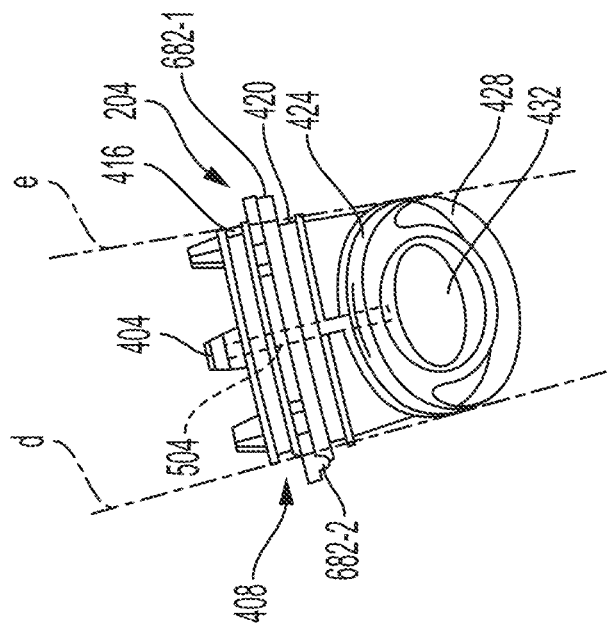
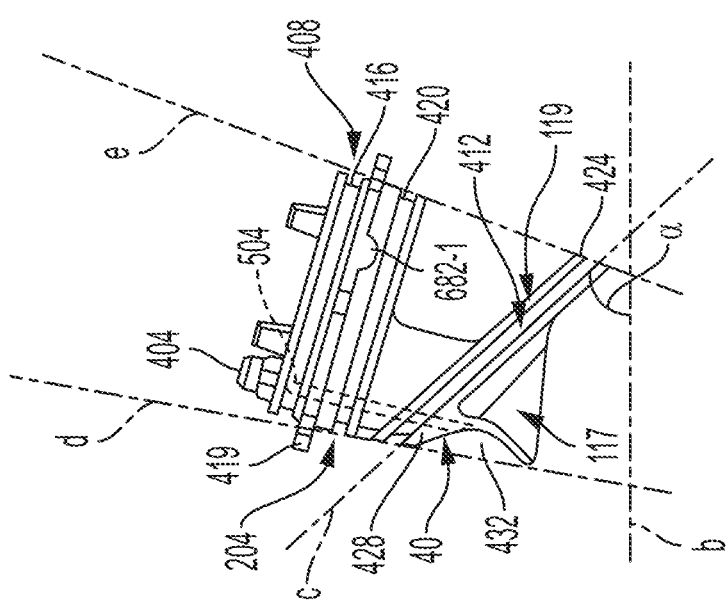

COMPACT VALVE ASSEMBLY

CROSS-REFERENCE TO RELATED APPLICATIONS

This application is a U.S. National Stage Application under 35 U.S.C. 371 International Application No. PCT/US2021/0416208 filed on Aug. 17, 2021, which claims the benefit and priority of U.S. Provisional Patent Application No. 63/066,411 filed on Aug. 17, 2020, the contents of which are incorporated by reference herein in their entirety for any purpose whatsoever.

FIELD OF THE DISCLOSURE

The subject disclosure relates to valve assemblies, and more particularly to backflow prevention valve assemblies having transversely oriented cartridge buckets.

BACKGROUND

In many water systems, backflow prevention (BFP) valves and assemblies allow fluid and even solids to flow only in a desired, i.e., a forward, direction. As backsiphonage or backflow can present contamination and health problems, the backflow prevention valves and assemblies prevent flow in an undesired direction, i.e., a backward or reverse direction. Backflow prevention valves and assemblies are installed in buildings, such as residential homes, and commercial buildings and factories, to protect public water supplies by preventing the reverse flow of water from the buildings back into the public water supply.

A typical backflow prevention assembly includes an inlet shutoff valve and an outlet shutoff valve with a backflow prevention valve extending between the inlet and outlet shutoff valves. Many different configurations of backflow prevention assemblies are commercially available, each being different in configuration and resulting lay-length.

Owing to the fact that BFP assemblies are important for water safety, they are tested annually, often per government regulations, to assure they are in proper operating condition. Specifically, fluid pressure measurements are taken at specified locations in the BFP unit. If it is determined that a check valve needs to be replaced, the inlet and outlet shutoff valves have to be closed, the check valve replaced and tested, the shutoff valves opened and the apparatus confirmed to be operating per any local ordinances and/or standards. The process is time-consuming and the steps have to be performed in the correct sequence in order to not contaminate the public water supply or inadvertently flood an area.

Examples of BFP assemblies are shown in: U.S. Pat. No. 4,489,746 issued on Dec. 25, 1984 to Daghe et al.; U.S. Pat. No. 5,566,704 issued on Oct. 22, 1996 to Ackroyd et al.; U.S. Pat. No. 3,837,358 issued on Sep. 24, 1974 to Zieg et al.; and U.S. Pat. No. 9,091,360 issued on Jul. 28, 2015 to Frahm, II, each of which is incorporated herein by reference. These references disclose BFP assemblies with taps or test cocks spread out along the BFP assembly body for checking pressures in different zones. As a result, the BFP assemblies are unduly elongated.

SUMMARY

What is needed is a new and improved valve assembly that reduces the number of components needed, simplifies assembly and servicing, and that facilitates certification testing. Further, a more compact and functional cartridge bucket arrangement and BFP assembly would save space and materials cost. The subject technology provides some or all of these benefits along with improved ease of assembly and performance.

The present disclosure provides a new and improved valve assembly including a body having a first bucket with a sidewall extending between a closed end and an open end along a first bucket axis, a first conduit extending from an inlet of the sidewall of the first bucket, and a second bucket having a sidewall extending between a closed end and an open end along a second bucket axis. A second conduit extends between an outlet of the sidewall of the first bucket and an inlet of the sidewall of the second bucket, and a third conduit extends from an outlet of the sidewall of the second bucket. The conduits extend along a conduit axis that is perpendicular to the bucket axes. The valve assembly also includes covers secured over the open ends of the buckets and a valve member located in each bucket that is biased to prevent reverse flow through the inlets of the buckets.

In one embodiment of the present disclosure, the buckets are oriented so that the bucket axes point in a same direction.

In another embodiment, the buckets are oriented so that the bucket axes point in opposite directions.

In one embodiment, the buckets are oriented so that the bucket axes point in directions that are perpendicular with respect to one another.

In one embodiment, the buckets are oriented so that the bucket axes point in different directions. In one embodiment, the valve assembly includes a frame slidingly received within each of the buckets in alignment with the bucket axes, wherein each frame includes a valve seat defining a port. The frames are oriented within the buckets so that the ports align with the inlet of the buckets, and the valve members located in each bucket are biased against the valve seats of the frames.

In one embodiment, an inner diameter of the sidewall of each of the buckets tapers between the open end and the closed end of the bucket, and an outer diameter of each of the frames generally aligns with the inner diameter of the sidewalls of the buckets to create a tapering fit between the frames and the buckets.

An embodiment of the subject technology is directed to a backflow prevention assembly including a body extending from an inlet to an outlet along a flow axis. The body includes a first bucket having a first sidewall extending between a first closed end and a first open end along a first bucket axis, wherein the first sidewall has an inward taper towards the first closed end. The body also includes a second bucket having a second sidewall extending between a second closed end and a second open end along a second bucket axis. A first test cover assembly encloses the first bucket and a second test cover assembly encloses the second bucket. Each test cover assembly has a larger diameter than a diameter of the respective closed end. The first and second bucket axes are offset so that the first and second buckets can be tightly spaced. In one embodiment, the test cover assemblies include a test cover and a coupling ring for securing the test cover to the bucket and the flow axis is approximately perpendicular to the first and second bucket axes. Preferably, the buckets are oriented so that the bucket axes are parallel with opposing open ends or the buckets are oriented so that the bucket axes are perpendicular with respect to one another. The buckets can also be oriented so that the bucket axes point in different directions. The second sidewall may also have an inward taper towards the second closed end, with a frame in each bucket, each frame having three identical o-rings for sealing to the respective bucket and test cover assembly, wherein each frame has a valve seat at an angle with respect to the flow axis and the respective bucket axis.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure. In the Figures:

FIG. 4C is a side view of the dual-zone frame of FIG. 4A;

FIG. 4D is another side view of the dual-zone frame of FIG. 4A;

DETAILED DESCRIPTION

Figure 1:
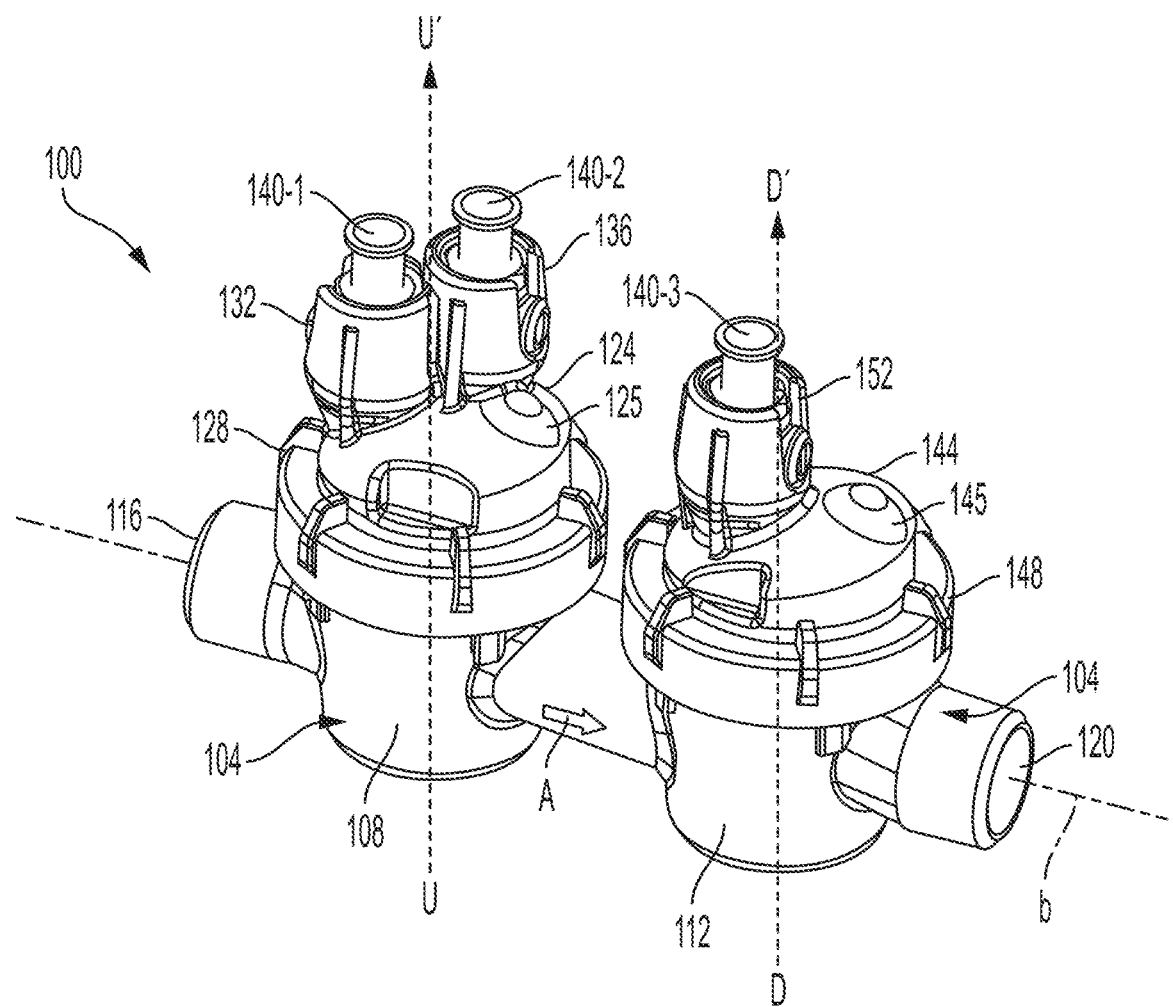
FIG. 1 is a valve assembly in accordance with an aspect of the present disclosure.

The subject technology overcomes many of the prior art problems associated with valve assemblies and, in particular, backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, there is shown a backflow prevention (BFP) valve assembly 100 in accordance with an aspect of the present disclosure. The BFP valve assembly 100 is installed in a fluid system, e.g., a water supply for a building, and can be mounted at a location in the ground (not shown). In normal operation, the fluid system operates to carry fluid in only a forward direction, e.g., left to right in FIG. 1, as shown by the arrow A. The valve assembly 100 operates to prevent flow in a backward direction, i.e., a direction opposite to that of arrow A, as is known to those of ordinary skill in the art.

The BFP valve assembly 100 includes a bucket body 104 in which an upstream bucket 108 and a downstream bucket 112 are defined. The designations of "upstream" and "downstream" are with respect to the forward direction of flow A along axis "b". The upstream bucket 108 has a bucket axis shown by line U-U'. The downstream bucket 108 has a bucket axis shown by line D-D'. An inlet 116 is defined in the bucket body 104 and is coupled through the upstream bucket 108 and the downstream bucket 112 to an outlet 120. The bucket body 104 can be made from plastic, brass or cast iron, for example, but not limited thereto, as is known to those of ordinary skill in the art. In addition, although not shown, an inlet shutoff valve (not shown) is positioned upstream of the inlet 116 and an outlet shutoff valve is positioned downstream of the outlet 120.

In one aspect of the present disclosure, a dual-zone test cover 124 is coupled to the upstream bucket 108 by a first coupling ring 128. The dual-zone test cover 124 is generally circular and includes a first shroud 132 and a second shroud 136. Each of the first shroud 132 and the second shroud 136 has a respective test cock 140-1, 140-2 disposed therein and each test cock 140-1, 140-2 is in fluid connection with a respective interior portion of the upstream bucket 108.

A single-zone test cover 144 is coupled to the downstream bucket 112 by a second coupling ring 148 and includes a single shroud 152 with a respective test cock 140-3 disposed therein and in fluid connection with an interior portion of the downstream bucket 112. The operation of the test cocks 140-1, 140-2, 140-3 will be discussed below in more detail. Each of the covers 124, 144 is configured to couple to the respective bucket 108, 112.

Each shroud 132, 136, 152 protects the respective test cock 140-1, 140-2, 140-3 from being damaged. As is known, the test cocks 140-1, 140-2, 140-3 are used to implement certification testing of the BFP valve assembly 100, per known test procedures. The test cocks 140-1, 140-2, 140-3 extend from the test covers 124, 144 in order to be accessed by a technician conducting the test. Accordingly, the test cocks 140-1, 140-2, 140-3 are vulnerable to being accidentally, or in some cases maliciously, damaged. A test cock can be caught on something or someone passing by or leveraged, i.e., intentionally broken off. The shrouds 132, 136, 152 protect the test cocks 140-1, 140-2, 140-3 from such events while still allowing access to the test cocks 140-1, 140-2, 140-3 for certification testing of the BFP valve assembly 100.

Figure 2:
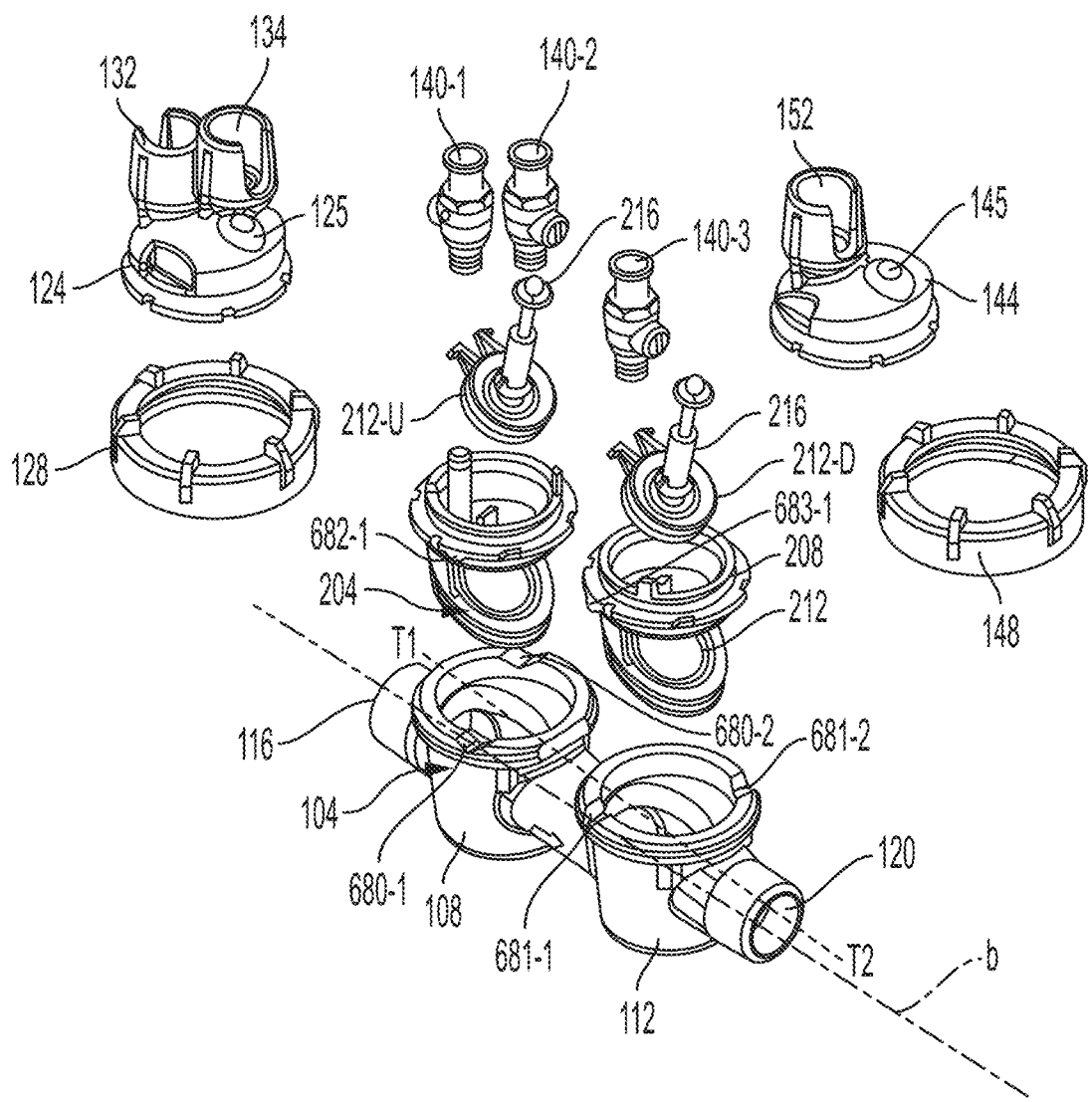
FIG. 2 is an exploded view of the valve assembly of FIG. 1.
Figure 3:
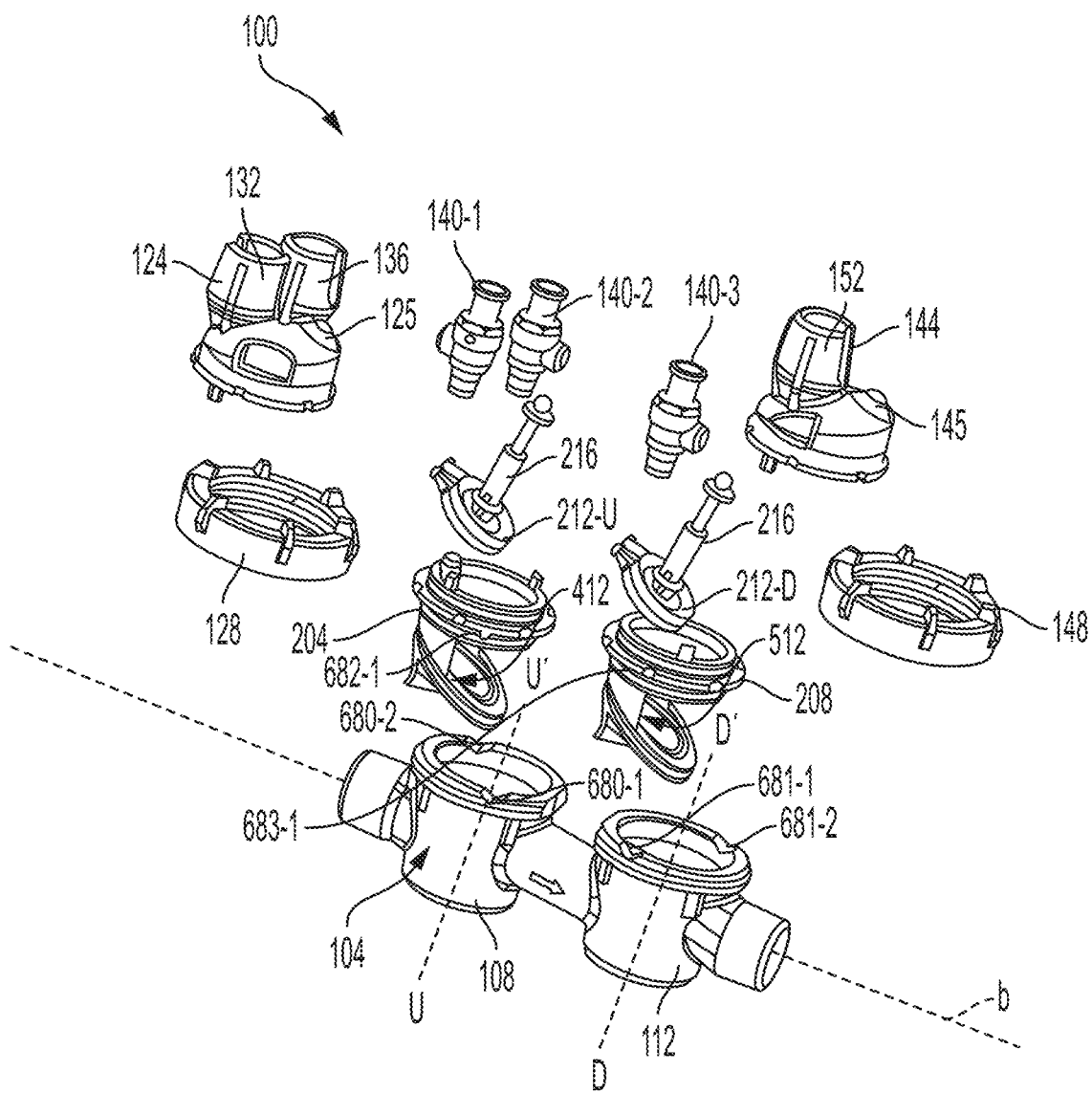
FIG. 3 is another exploded view of the valve assembly of FIG. 1.

There are additional components in the BFP valve assembly 100 and those are presented in FIG. 2 and FIG. 3, per exploded views of the BFP valve assembly 100. A dual-zone frame 204 is disposed in the upstream bucket 108 and a single-zone frame 208 is disposed in the downstream bucket 112. These frames 204, 208 help implement testing of the BFP valve assembly 100 and are discussed further below.

An upstream valve member 212-U is hingeably coupled to the dual-zone frame 204. The upstream valve member 212-U is urged against an opening 412 in the dual-zone frame 204 by a telescoping biasing assembly 216 that is disposed between the upstream valve member 212-U and an underside of a hollow 125 formed in the dual-zone test cover 124.

Similarly, a downstream valve member 212-D is hingeably coupled to the single-zone frame 208. The downstream valve member 212-D is urged against an opening 512 in the single-zone frame 208 by a respective telescoping biasing assembly 216 that is disposed between the downstream valve member 212-D and a hollow 145 of the single-zone test cover 144. As will be discussed below, these components operate in conjunction with one another to allow fluid to flow in the forward direction and prevent the backflow of fluid.

Figure 4A:
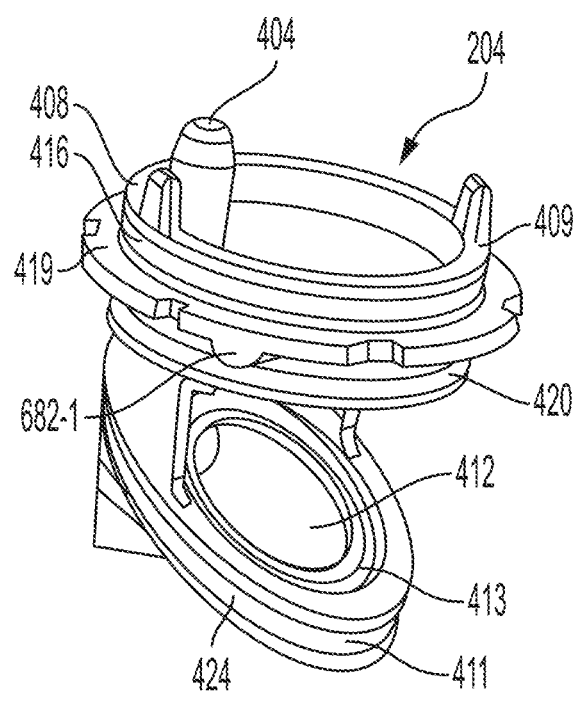
FIG. 4A is a perspective view of a dual-zone frame of the valve assembly of FIG. 1.

The dual-zone frame 204, referring now to FIG. 4A, provides for a compact and effective division of the upstream bucket 108 while maintaining a large flowpath. A nipple 404 is disposed on an outer periphery 408 of an upper portion 409 of the dual-zone frame 204. Further, a port opening 412 is defined by a valve seat 413 in a lower portion 411 of the dual-zone frame 204. The opening 412 of the valve seat 413 is selectively closed by the valve member 212-U. The dual-zone frame 204 divides the upstream bucket 108 into two separate zones 117, 119. The upstream zone 117 and the downstream zone 119 are on each side of the closed valve seat 413 and best seen in FIG. 4C. A line "c" is drawn in through the valve seat 413 to illustrate how the valve seat 413 is set an angle "a" with respect to the flow axis "b." In a preferred embodiment, the angle "a" is between zero and ninety degrees. In one embodiment, the angle "a" is approximately forty-five degrees as shown in FIG. 4C. By having the valve seat 413 angled, the port opening 412 can be enlarged to allow for good flow.

Figure 4B:
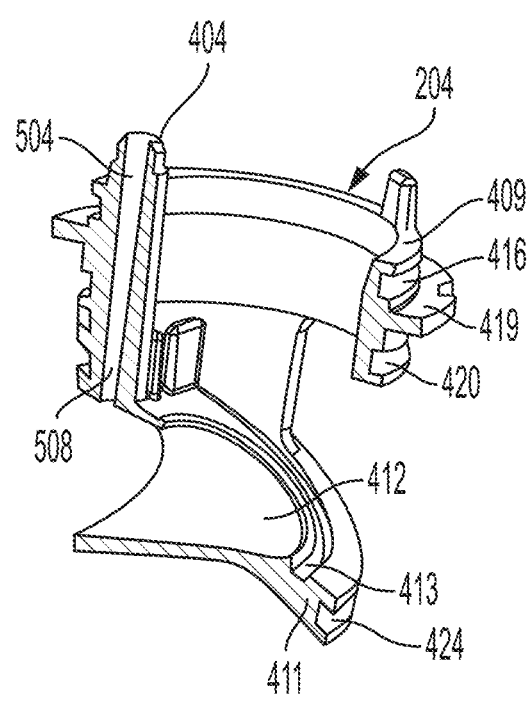
FIG. 4B is a sectional view of the dual-zone frame of FIG. 4A.

A cross-section of the dual-zone frame 204 is presented in FIG. 4B. As can be seen, the nipple 404 is the entrance to a lumen 504 defined within the dual-zone frame 204. The lumen 504 has a distal opening 508 that is positioned adjacent the port opening 412 in communication with the upstream zone 117, the function of which will be further described below. In operation, the nipple 404 is connected to the test cock 140-1.

As shown best in FIG. 4C, the dual-zone frame 204 includes an upper groove 416 and a lower groove 420 disposed around the outer periphery 408. A hardstop ring 419 projects outward in between the grooves 416, 420. In addition, a distal groove 424 is provided about a bottom portion 428 of the frame 204. Each of the grooves 416, 420, 424 is sized to receive an o-ring 604-1, 604-2, 604-3 (see FIG. 6A) to provide a leak-proof seal when the frame 204 is placed in the upstream bucket 104, as will be explained in more detail below. It should be noted that "upper," "lower," "bottom" and "top" are for explanatory purposes with respect to the figures and not otherwise limiting.

FIG. 4D is a view of the dual-zone frame 204 of FIG. 4C from the direction shown by the arrow 4D in FIG. 4C. As is shown, a second opening 432 is provided in the bottom portion 428. As will be understood from the discussion below, the second opening 432 and the port opening 412, when placed in the bucket 108 provide a fluid path through the bucket 108. As best seen in FIGS. 4C and 4D, the geometry of the dual-zone frame 204 tapers from the top to the bottom as highlighted by taper lines "d" and "e."

Figure 4E:
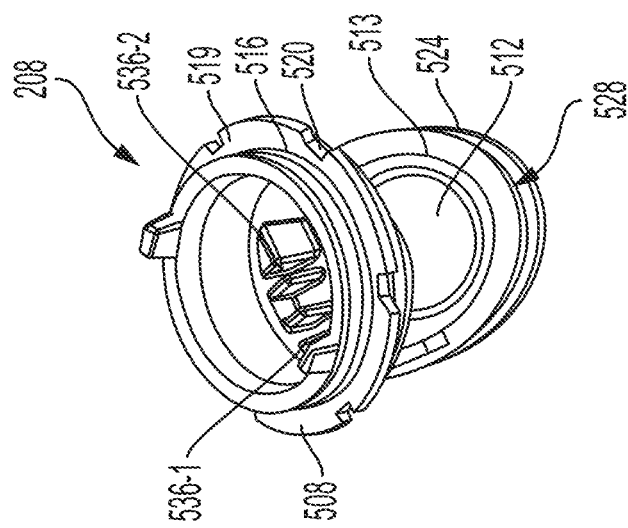
FIG. 4E is a perspective view of the dual-zone frame of FIG. 4A.

A top perspective view of the dual-zone frame 204 is presented in FIG. 4E. A pair of U-shaped notches 436-1, 436-2 are provided adjacent the port opening 412. The U-shaped notches 436-1, 436-2 are configured to receive the upstream valve member 212-U, not shown here, such that the upstream valve member 212-U is hingeably coupled to the frame 204 to open or close the port opening 412.

Figure 5:
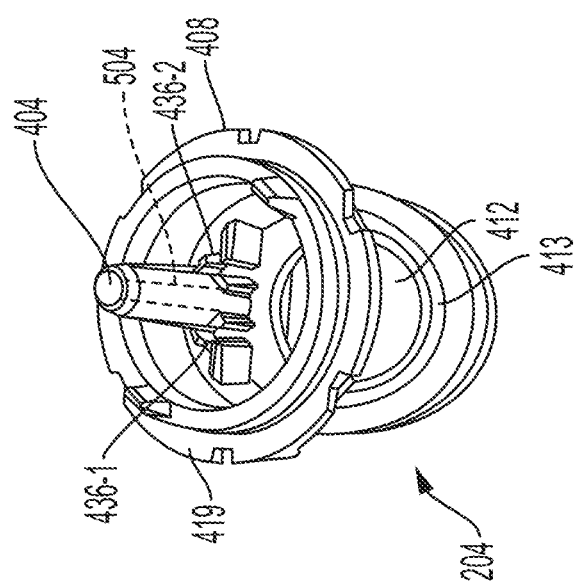
FIG. 5 is a perspective view of a single-zone frame of the valve assembly of FIG. 1.

Referring now to FIG. 5, the single-zone frame 208 is similar in geometry to that of the dual-zone frame 204 except that there is no lumen as in the frame 204. The single-zone frame 208 also tapers down. The single-zone frame 208 includes an outer periphery 508 with an upper groove 516 and a lower groove 520 disposed around the outer periphery 508. A hardstop ring 519 projects outward in between the grooves 516, 520.

In addition, a distal groove 524 is provided about a bottom portion 528 of the frame 208. Each of the grooves 516, 520, 524 is sized to receive an o-ring 608-1, 608-2, 608-3 (see FIG. 6A) to provide a leak-proof seal when the frame 208 is placed in the downstream bucket 112, as will be explained in more detail below. Further, a port opening 512 is defined by a valve seat 513 in a lower portion of the single-zone frame 208. It should be noted again that "upper," "lower," "top" and "bottom" are for explanatory purposes and not otherwise limiting.

The single-zone frame 208 also includes a pair of U-shaped notches 536-1, 536-2 provided adjacent the port opening 512. The U-shaped notches 536-1, 536-2 are configured to receive the downstream valve member 212-D, not shown here, such that the downstream valve member 212-D is hingeably coupled to the frame 208 to open or close the port opening 512, as discussed herein.

Figure 6A:
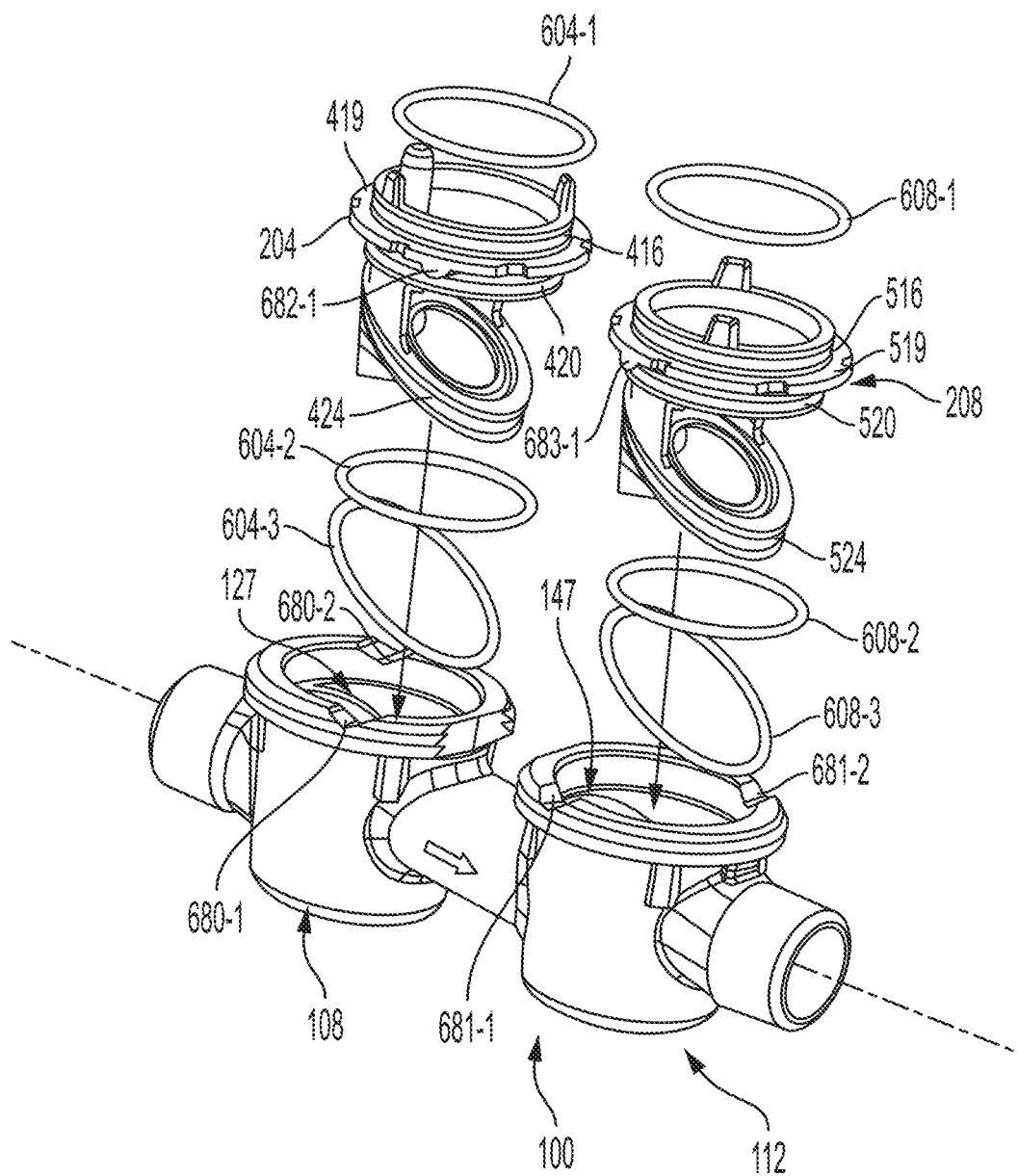
FIG. 6A is an exploded perspective view of the dual-zone frame, the single-zone frame, O-rings and a valve body of the valve assembly of FIG. 1.
Figure 6B:
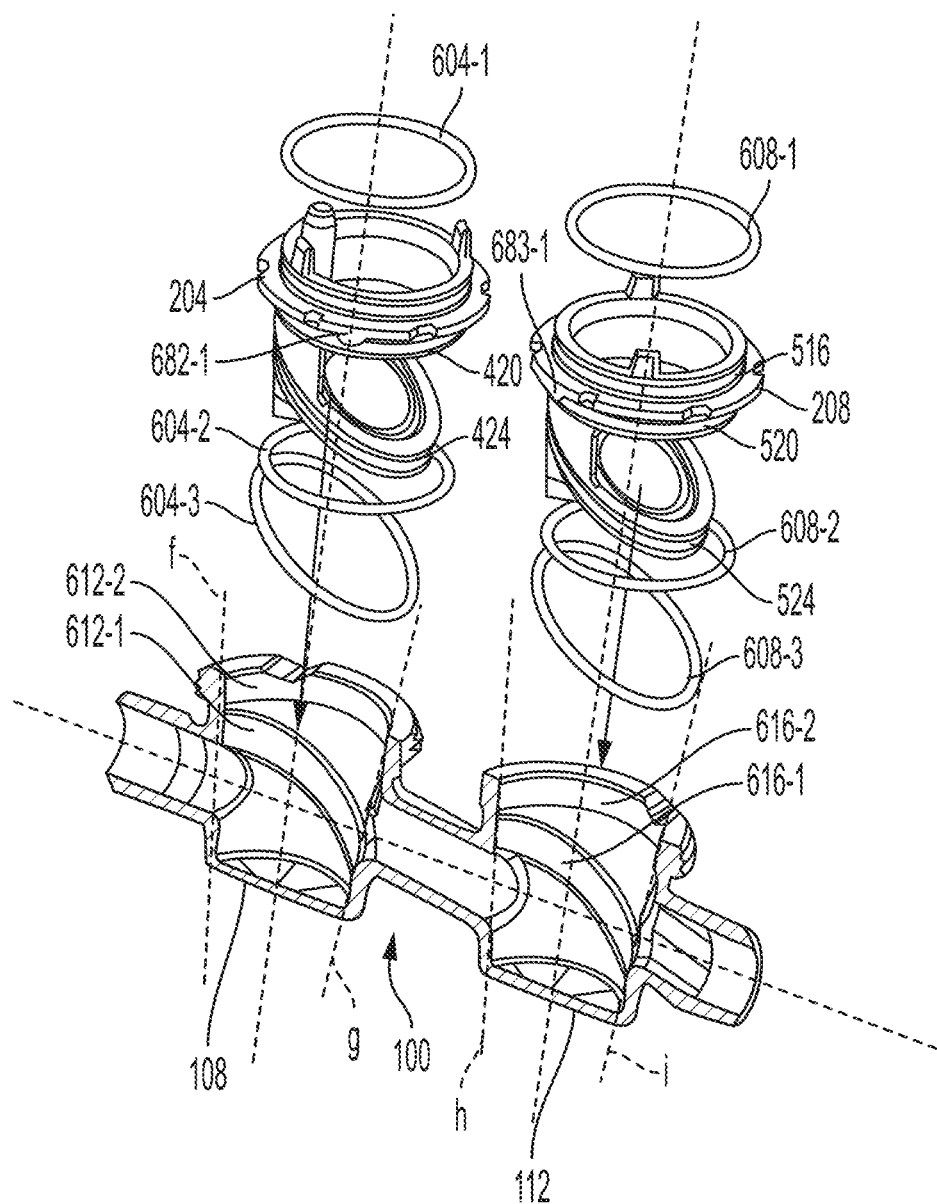
FIG. 6B is a partial cross-sectional view of FIG. 6A.

The dual-zone frame 204 is slidably provided in the upstream bucket 108 as shown in FIGS. 6A and 6B. Similarly, the single-zone frame 208 is slidably provided in the downstream bucket 112. The depth of insertion of the frames 204, 208 in the buckets 108, 112 is limited by the hardstop rings 419, 519. The frames 204, 208 comprise a material that is resistant to the fluid that is flowing through the BFP valve assembly 100. These materials can include a hard plastic or metal or other material known to those of ordinary skill in the art.

O-rings 604-1, 604-2, 604-3 are provided, respectively, in the upper groove 416, lower groove 420 and the distal groove 424 of the dual-zone frame 204. Similarly, o-rings 608-1, 608-2, 608-3 are provided, respectively, in the upper groove 516, lower groove 520 and the distal groove 524 of the single-zone frame 208. The O-rings in the lower and distal grooves provide a leak-proof seal against an interior surface of the respective bucket. The o-rings in the upper grooves provide a seal with an interior surface of the respective cover 124, 144. Preferably, the o-rings 604-1, 604-2, 604-3, 608-1, 608-2, 608-3 are identical and the taper of the frames 204, 208 prevents o-ring twisting and jamming during installation. The o-rings can be made of materials known those of ordinary skill in the art including, but not limited to, Nitrile, Ethylene Propylene Rubber, Fluorocarbon, Neoprene, Polyurethane, Silicone and PTFE.

Each of the buckets 108, 112 tapers as shown by taper lines "f" and "g" as well as taper lines "h" and "i" in FIG. 6B. The buckets 108, 112 taper in a complimentary manner to the taper of the frames 204, 208. The o-rings 604-2, 604-3, 608-2, 608-3 are pressed against the respective bucket 204, 208 to provide the seal. The o-rings 604-1, 608-1 are pressed against the respective test cover 124, 144 to provide further sealing. Each of the buckets 108, 112 includes a respective raised surface 612-1, 616-1 that corresponds to a periphery of the lower portion of the frame 204, 208 as shown in FIG. 6B. The raised surfaces 612-1, 616-1 are angled similarly to the distal grooves 424, 524 so that the o-rings 604-3, 608-3 in the distal grooves 424, 524 are pressed against the respective surface 612-1, 616-1 to provide the seal. Each of the buckets 108, 112 also includes a respective raised surface 612-2, 616-2 that corresponds to a periphery of the upper portion of the frame 204, 208 as shown in FIG. 6B. Thus, the o-rings 604-2, 608-2 that are provided in the lower grooves 420, 520 are pressed against the respective raised surface 612-2, 616-2 to provide the seal.

It should be noted that the upstream bucket 108 and the downstream bucket 112 are of a same size and have a same interior 127, 147. Further, the dual-zone frame 204 and the single-zone frame 208 have a same size with the difference being the lumen 504 provided in the dual-zone frame 204, as described above.

One aspect of the present disclosure, however, is provided to ensure that the dual-zone frame 204 can only be assembled in the upstream bucket 108 and the single-zone frame 208 can only be assembled in the downstream bucket 112. In the exemplary embodiment shown in FIG. 2, a first set of grooves 680-1, 680-2 is provided and arranged in the upstream bucket 108 and a first set of depending ridges 682-1, 682-2 is provided and correspondingly arranged in the dual-zone frame 204. As shown in FIG. 2, if a virtual line T1-T2 represents a portion of an analog clock-face with 12 o'clock at T1 and 6 o'clock at T2, then the grooves 680-1, 680-2 are provided along a line from 2 o'clock to 8 o'clock.

Similarly, a second set of grooves 681-1, 682-2 is provided and arranged in the downstream bucket 112 and a second set of ridges 683-1, 683-2 is provided and correspondingly arranged in the single-zone frame 208 at 4 o'clock and 10 o'clock, i.e., different from the arrangement of the first set of grooves 680-1, 680-2. In other words, the upstream bucket 108 and the downstream bucket 112 are keyed such that the different angles, orientations or locations of the first and second sets of grooves 680, 681 and ridges 682, 683 ensure that the dual-zone frame 204 and the single-zone frame 208 can only be properly assembled, respectively, in the upstream bucket 108 and the downstream bucket 112.

It should be noted that the arrangement, angle and number of grooves and ridges shown are for explanatory purposes only and should not be considered as limiting. Accordingly, there could be only one groove and corresponding ridge or more than two grooves and corresponding ridges. Further, the number of corresponding grooves and ridges need not be the same for the upstream bucket 108/dual-zone frame 204 pair as for the downstream bucket 112/single-zone frame 208 pair.

Figures 7A, 7B:
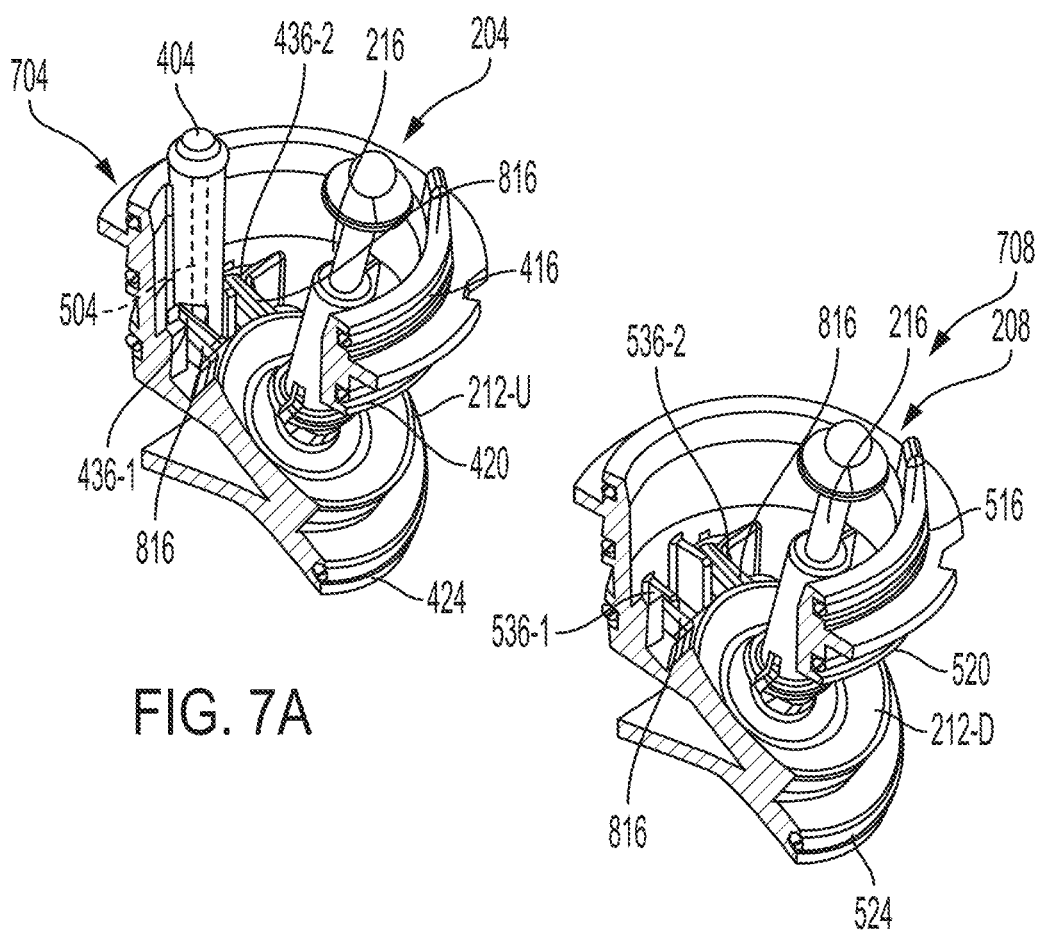
FIG. 7A is a partial cross-sectional view of a dual-zone sensing insert assembly of the valve assembly of FIG. 1.
FIG. 7B is a partial cross-sectional view of a single-zone sensing insert assembly of the valve assembly of FIG. 1.

Referring now to FIG. 7A, another dual-zone sensing insert assembly 704 is shown. The dual-zone sensing insert assembly 704 includes the dual-zone frame 204, the o-rings 416, 420, 424, the upstream valve member 212-U hingeably coupled to the dual-zone frame 204, and the telescoping biasing assembly 216 coupled to the valve member 212-U.

Referring now to FIG. 7B, a single-zone sensing insert assembly 704 is shown in cross-section. The single-zone sensing insert assembly 704 includes the single-zone frame 208, the o-rings 516, 520, 524, the upstream valve member 212-D hingeably coupled to the dual-zone frame 204, and the telescoping biasing assembly 216 coupled to the valve member 212-D.

Referring now to FIGS. 2, 3 7A and 7B, the upstream valve member 212-U and the downstream valve member 212-D are of the same structure and arrangement of components. The valve members 212-U, 212-D couple to the respective telescoping biasing assembly 216 such as with a ball and socket arrangement. The valve members 212-U, 212-D pivot to open or close the respective port openings 412, 512. The valve members 212-U, 212-D are urged to close the port opening 412 by operation of the biasing assemblies 216.

Figure 8:
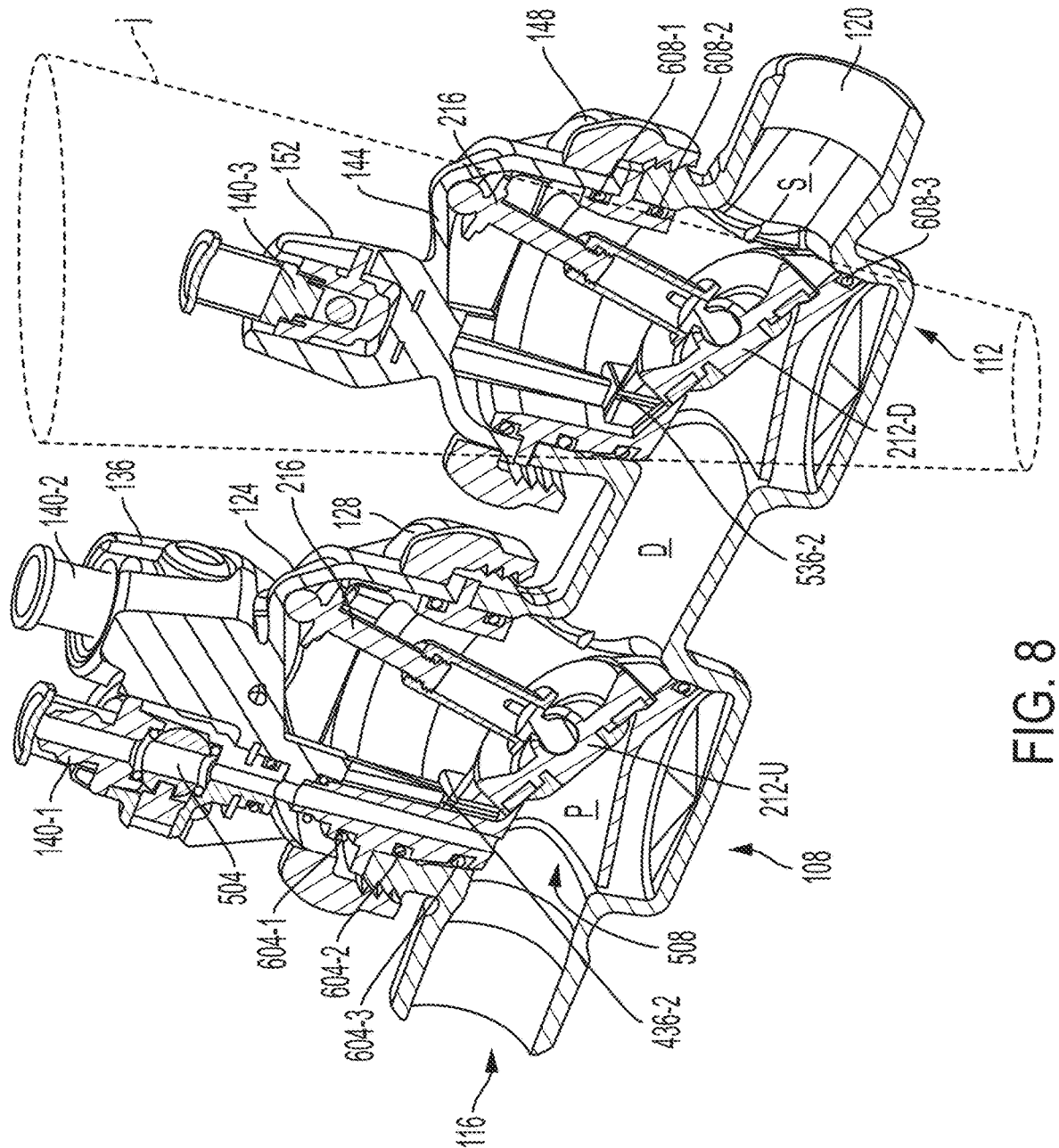
FIG. 8; is a sectional view of the valve assembly of FIG. 1.

When the BFP valve assembly 100 is assembled, as shown in cross-section in FIG. 8, and no fluid is flowing therethrough, the upstream valve member 212-U and the downstream valve member 212-D are urged into place over the respective port openings 412, 512 and, therefore, the frames 204, 208 are closed. This condition occurs due to the urging of the telescoping biasing assembly 216 against the valve members 212-U, 212-D. As a result, three separate spaces or zones P, D and S are created. The taper of the bucket 112 and single-zone frame 208 is illustrated by cone "j."

A backflow prevention assembly is regularly tested, for example, annually, to assure that the backflow prevention assembly is in proper operating condition. Specifically, fluid pressure measurements are taken at specified locations in the backflow prevention assembly. The test cocks are provided to facilitate these pressure measurements.

Advantageously, the dual-zone frame 204 has divided the upstream bucket 108 into the two zones P, D on each side of the upstream valve member 212-U when closed, respectively (see line "c" in FIG. 4C). Similarly, the single-zone frame 208 divides the downstream bucket 112 into two zones D, S. Zone P is tested using test cock 140-1 via the lumen 504. Zone D is tested using test cock 140-2 via a passage in the test cover 124. Zone S is tested using test cock 140-3 using a passage in the test cover 144. The arrangement represents a reduction in the number of components needed relative to known systems. Reducing the parts count lowers costs and reduces opportunities for system failures. Further, the parts are more easily and cost-effectively produced.

The pressure tests for zones P, D, S are easily performed. In one non-limiting example of pressure-testing for compliance with certification requirements, a FEBCO® Series TK-1 Backflow Preventer Test Kit, available from Watts Regulator Co., can be used. An example of the steps involved in testing is found at least in U.S. Pat. No. 5,566,704, the entire contents of which is herein incorporated by reference for all purposes.

One of ordinary skill in the art will understand that, in normal operation, the force exerted by the respective telescoping biasing assembly 216 on the upstream valve member 212-U and the downstream valve member 212-D is overcome by the pressure exerted by the fluid normally flowing from the inlet 116 to the outlet 120. If there is a pressure change (e.g., a drop in pressure from the supply source), the upstream valve member 212-U and/or the downstream valve member 212-D will close to prevent backflow.

Figure 9:
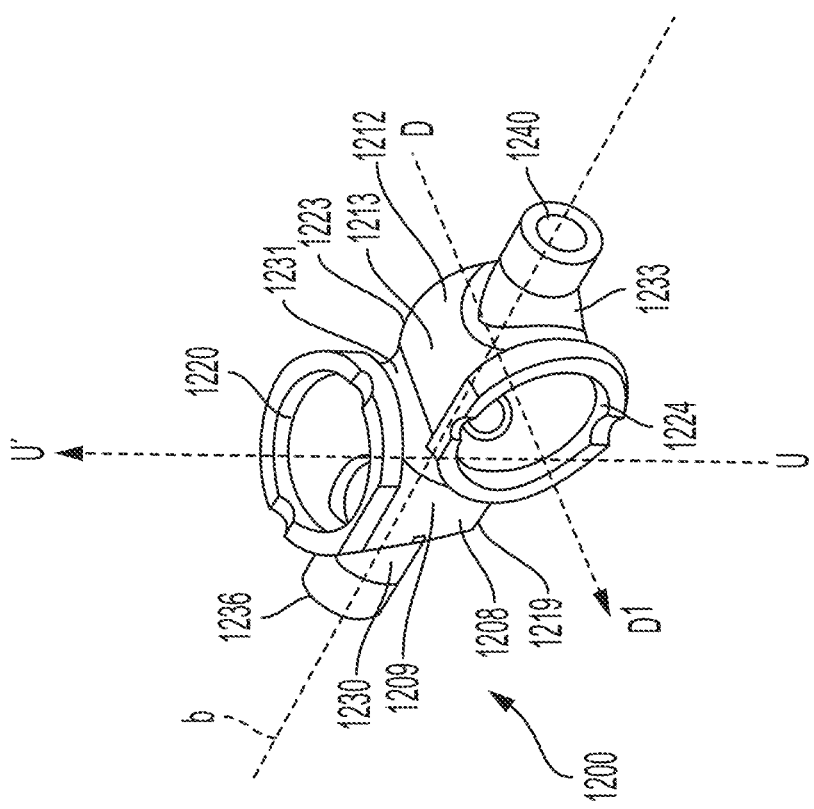
FIG. 9 is a perspective view of an exemplary embodiment of a valve body where the buckets are skewed ninety degrees with respect to one another in accordance with another aspect of the present disclosure.

Referring now to FIG. 9, a perspective view of another exemplary embodiment of a valve body 1200 for a backflow prevention valve assembly is shown. In brief overview, the buckets 1208, 1212 are skewed ninety degrees with respect to one another so that the buckets 1208, 1212 can be tightly spaced, which saves space and materials among other benefits.

FIG. 9 includes the flow axis "b" extending between an inlet 1236 and an outlet 1240. The upstream bucket 1208 has a bucket axis shown by line U-U'. The downstream bucket 1208 has a bucket axis shown by line D-D'. As can be seen, each bucket axis is not only perpendicular to the flow axis "b" but also perpendicular to each other.

Each bucket 1208, 1212 has a sidewall 1209, 1213 extending between a closed end 1219, 1223 and an open end 1220, 1224. Preferably, the sidewalls 1209, 1213 taper towards the closed ends 1219, 1223. An upstream conduit 1230 extends from the sidewall 1209 of the upstream bucket 1208. A second conduit 1231 extends between the sidewalls 1209, 1213. A third conduit 1233 extends downstream from the sidewall 1213 of the downstream bucket 1212. The conduits 1230, 1231, 1233 extend along the flow axis "b." Each bucket 1208, 1212 has a check valve assembly and a test cover (not shown) secured over the open ends 1220, 1224 of the buckets 1208, 1212 as described above. Similar to above, it is envisioned that the test covers would be held in place by a coupling ring so that the overall diameter of the test cover and/or coupling ring would be larger than the closed ends 1219, 1223 and, typically, the open ends 1220, 1224. However as the bucket axis are rotated ninety degrees with respect to each other, the buckets 1208, 1212 can be more closely positioned together, e.g., more tightly spaced, than the diameter of the test cover and/or coupling ring would allow if aligned. In other words, the buckets 1208, 1212 are tightly spaced by misaligning the open ends 1220, 1224. It is envisioned that the bucket axis can point in many different directions of various angles with respect to each other.

Figure 10:
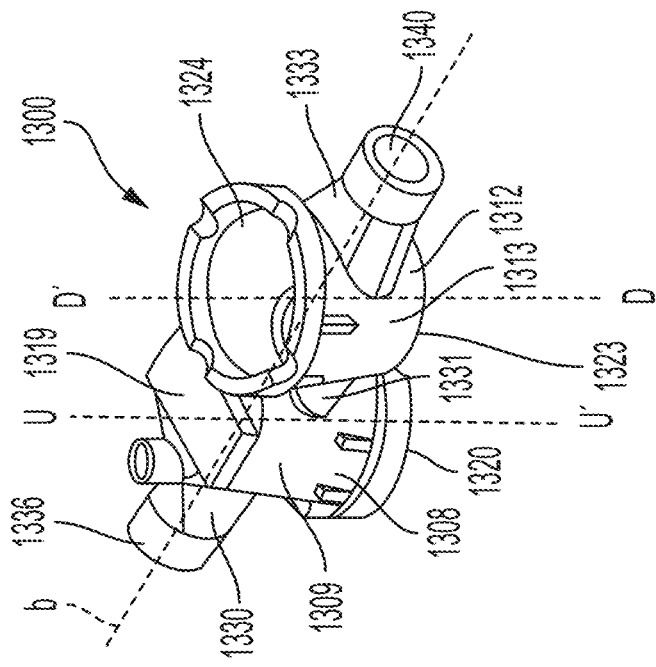
FIG. 10 is a perspective view of an exemplary embodiment of a valve body where the buckets have opposing open ends in accordance with another aspect of the present disclosure.

Referring now to FIG. 10, it illustrates a perspective view of an exemplary embodiment of a valve body 1300 where the buckets 1308, 1312 have opposing open ends 1320, 1324 in opposing positions. Similar elements to those described in connection with the above-described embodiment of FIG. 9 are indicated with the like reference numbers in the "1300" series. Many elements are essentially the same as those of the foregoing embodiments and, thus, are not further described herein. The primary difference between the valve bodies 1200, 1300 is the orientation of the buckets 1208, 1212, 1308, 1312.

The bucket axes are oriented parallel but in opposite directions, i.e. with the open ends 1320, 1324 opposing each other. Several factors enhance the ability to tightly space the buckets 1308, 1312 beyond just offsetting the open ends 1320, 1324. For example, the inward tapering sidewalls 1309, 1313 create additional room to tighten the spacing. Also, when the open ends 1320, 1324 are opposing, the open ends 1320, 1324 may pass beyond the closed ends 1319, 1323 of the other bucket to allow further tightening of the spacing.

Each of the BFP bodies 1200 and 1300 can incorporate the features as described above. Further, each of the valve body 1200 and the valve body 1300 advantageously provides for a more compact, i.e., a shorter, length to facilitate placement in tighter physical locations. The 90° rotation (body 1200) or 180° rotation (body 1300) provide options where the clearance for the test cocks can be tight due to reduced clearance dimensions. While orientations at 90° or 180° are shown as examples, it is envisioned that the relative orientation angles can be at an angle in the range of 0°-180°.

The subject components can be fabricated from any suitable material or combination of materials such as lightweight stainless steel, epoxy coated carbon steel, zinc plated carbon steel, copper, copper alloys, suitable plastics and composites, and the like.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, shut-off valves, and the like) shown as distinct for purposes of illustration can be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A valve assembly, comprising:
    a body including:
        a first bucket having a sidewall extending between a closed end and an open end along a first bucket axis,
        a first conduit extending from an inlet of the sidewall of the first bucket,
        a second bucket having a sidewall extending between a closed end and an open end along a second bucket axis,
        a second conduit extending between an outlet of the sidewall of the first bucket and an inlet of the sidewall of the second bucket, and
        a third conduit extending from an outlet of the sidewall of the second bucket, Wherein the conduits extend along a conduit axis that is perpendicular to the bucket axes;
    a valve member located in each bucket and biased to prevent reverse flow through the inlets of the buckets; and
    covers secured over the open ends of the buckets,
    wherein the buckets are oriented in a configuration selected from the group consisting of: the bucket axes are parallel and one of the open ends opposes the other open end; the bucket axes are perpendicular with respect to one another and tightly spaced; and the bucket axes point in different directions and tightly spaced.

2. A valve assembly according to claim 1, wherein an inner diameter of the sidewall of each of the buckets tapers between the open end and the closed end of the bucket.

3. A valve assembly, comprising:
    a body including:
        a first bucket having a sidewall extending between a closed end and an open end along a first bucket axis,
        a first conduit extending from an inlet of the sidewall of the first bucket,
        a second bucket having a sidewall extending between a closed end and an open end along a second bucket axis,
        a second conduit extending between an outlet of the sidewall of the first bucket and an inlet of the sidewall of the second bucket, and
        a third conduit extending from an outlet of the sidewall of the second bucket, wherein the conduits extend along a conduit axis that is perpendicular to the bucket axes;
    a valve member located in each bucket and biased to prevent reverse flow through the inlets of the buckets;
    covers secured over the open ends of the buckets; and
    a frame slidingly received within each of the buckets in alignment with the bucket axes, wherein each frame includes a valve seat defining a port, and the frames are oriented within the buckets so that the ports align with the inlets of the buckets; and a seal located between at least one of the frames and the sidewall of the bucket, wherein:

an outer diameter of each of the frames aligns with an inner diameter of the sidewalls of the buckets to create a tapering fit between the frames and the buckets, enabling drop-in insertion of each of the frames within each of the buckets along the respective bucket axes, and the valve members located in each bucket are biased against the valve seats of the frames.

4. A valve assembly according to claim 3, further comprising a seal located between each frame and the sidewalls of the buckets, each sidewall including a raised surface for mating with the respective seal, wherein:

the valve seat of each frame is at an angle with respect to the conduit axis and the respective bucket axis; and the raised surface of each sidewall is angled to mate with the respective seal.

5. A valve assembly according to claim 4, wherein the seals comprise at least one o-ring and each of the frames is in alignment with the respective bucket axis.

6. A valve assembly according to claim 3, wherein:

the first and second bucket each has a first volume space and a second volume space defined by a respective valve member that is biased against a respective valve seat of a respective frame;

at least one of the frames includes a lumen for extending from the open end of the respective bucket to the first respective volume space;

the cover over the frame with the lumen includes a first opening in fluid communication with the lumen and a second opening in fluid communication with the respective second volume space; and a first test cock is externally connected to the first opening of the cover and communicates with the first volume space through the lumen and a second test cock is externally connected to the second opening of the cover and communicates with the respective second volume space.

7. A valve assembly comprising:

a body including:

a first bucket having a sidewall extending between a closed end and an open end along a first bucket axis, a first conduit extending from an inlet of the sidewall of the first bucket, a second bucket having a sidewall extending between a closed end and an open end along a second bucket axis, a second conduit extending between an outlet of the sidewall of the first bucket and an inlet of the sidewall of the second bucket, and a third conduit extending from an outlet of the sidewall of the second bucket, wherein the conduits extend along a conduit axis that is at an angle to the bucket axes;

a valve member located in each bucket and biased to prevent reverse flow through the inlets of the buckets;

covers secured over the open ends of the buckets;

a frame within each of the buckets in alignment with the bucket axes, wherein each frame includes a valve seat defining a port, and the frames are oriented within the buckets so that the ports align with the inlets of the buckets; and wherein:

the valve members located in each bucket are biased against the valve seats of the frames;

an outer diameter of each of the frames aligns with an inner diameter of the sidewalls of the buckets to create a tapering fit between the frames and the buckets; and the valve seat of each frame is at an angle with respect to the conduit axis and the respective bucket axis.

8. A valve assembly according to claim 7, wherein each bucket includes a raised surface on each sidewall and each frame includes a seal so that the raised surface sealingly engages with the respective seal.

9. A backflow prevention assembly, comprising:

a body extending from an inlet to an outlet along a flow axis, the body including: a first bucket having a first sidewall extending between a first closed end and a first open end along a first bucket axis, wherein the first sidewall has an inward taper towards the first closed end; and a second bucket having a second sidewall extending between a second closed end and a second open end along a second bucket axis;

a first test cover assembly enclosing the first bucket; and a second test cover assembly enclosing the second bucket, wherein: each test cover assembly has a larger diameter than a diameter of the respective closed end; the first and second bucket axes are offset so that the first and second buckets are tightly spaced; and the second sidewall has an inward taper towards the second closed end, and further comprising a frame in each bucket, each frame having at least one o-ring for sealing to the respective bucket and test cover assembly, wherein each frame has a valve seat at an angle with respect to the flow axis and the respective bucket axis.

10. A backflow prevention assembly according to claim 9, wherein each test cover assembly includes a test cover and a coupling ring for securing the test cover to the respective bucket and the flow axis is perpendicular to the first and second bucket axes.

11. A backflow prevention assembly according to claim 9, wherein the buckets are oriented so that the bucket axes are parallel with opposing open ends.

12. A backflow prevention assembly according to claim 9, wherein the buckets are oriented so that the bucket axes are pointed in perpendicular directions with respect to one another.

13. A backflow prevention assembly according to claim 9, wherein the buckets are oriented so that the bucket axes point in different directions.

14. A valve assembly comprising:

a body including:

a first bucket having a sidewall extending between a closed end and an open end along a first bucket axis, a first conduit extending from an inlet of the sidewall of the first bucket, a second bucket having a sidewall extending between a closed end and an open end along a second bucket axis, a second conduit extending between an outlet of the sidewall of the first bucket and an inlet of the sidewall of the second bucket, and a third conduit extending from an outlet of the sidewall of the second bucket, wherein the conduits extend along a conduit axis that is at an angle to the bucket axes;

a valve member located in each bucket and biased to prevent reverse flow through the inlets of the buckets;

covers secured over the open ends of the buckets;

a frame within each of the buckets in alignment with the bucket axes, wherein each frame includes a valve seat defining a port, and the frames are oriented within the buckets so that the ports align with the inlets of the buckets; and wherein:

the valve members located in each bucket are biased against the valve seats of the frames;

the first and second bucket each has a first volume space and a second volume space defined by a respective valve member;

at least one of the frames includes a lumen for extending from the open end of the respective bucket to the first respective volume space;

the cover over the frame with the lumen includes a first opening in fluid communication with the lumen and a second opening in fluid communication with the respective second volume space; and a first test cock is externally connected to the first opening of the cover and communicates with the first volume space through the lumen and a second test cock is externally connected to the second opening of the cover and communicates with the respective second volume space.

* * * * *